United States Patent [19]
Schultz et al.

[11] Patent Number: 5,180,456
[45] Date of Patent: Jan. 19, 1993

[54] ADAPTIVE INFLATION CONTROL FOR VEHICLE CENTRAL TIRE INFLATION SYSTEM

[75] Inventors: Gary R. Schultz, Kalamazoo; Lawrence M. Ruzicka, Portage, both of Mich.

[73] Assignee: Eaton Corporation, Cleveland, Ohio

[21] Appl. No.: 792,552

[22] Filed: Nov. 15, 1991

[51] Int. Cl.[5] ............................................. B60C 23/00
[52] U.S. Cl. ................................. 152/416; 73/146.5; 141/1; 141/38; 141/83; 364/424.05; 364/550; 364/508
[58] Field of Search ..................... 152/415, 416; 364/424.05, 550, 558; 340/442; 73/146, 146.5, 146.3, 146.4; 141/38, 1, 83

[56] References Cited
U.S. PATENT DOCUMENTS

| | | | |
|---|---|---|---|
| 2,761,601 | 9/1956 | Van Vooren | 141/38 X |
| 4,421,151 | 12/1983 | Stumpe | 152/417 |
| 4,640,331 | 2/1987 | Braun et al. | 152/417 |
| 4,678,017 | 7/1987 | Schultz | 152/416 |
| 4,754,792 | 7/1988 | Braun et al. | 152/417 |
| 4,782,879 | 11/1988 | Le Chatelier et al. | 152/417 |
| 4,804,027 | 2/1989 | Runels | 152/417 |
| 4,883,106 | 11/1989 | Schultz et al. | 152/417 |
| 4,898,216 | 2/1990 | Schultz et al. | 141/4 |
| 4,905,742 | 3/1990 | Mohs | 141/38 |
| 4,922,946 | 5/1990 | Boulicault | 137/102 |
| 4,924,926 | 5/1990 | Schultz et al. | 152/417 |

Primary Examiner—Michael W. Ball
Assistant Examiner—Francis J. Lorin
Attorney, Agent, or Firm—P. S. Rulon

[57] ABSTRACT

An apparatus and method for a vehicle central tire inflation system (CTIS) produces a series of valve open signals in response to a demand tire pressure signal in which each valve open signal has a time period and a time space occurs between each open signal. The series of open signals terminates when the current tire pressure is at least equal to the demand tire pressure and upon termination, a count is made of the number of valve open signals. In each successive series of valve open signals, the time period is increased or decreased depending upon whether the previous count is greater or less than a predetermined count range.

4 Claims, 2 Drawing Sheets

ADAPTIVE INFLATION CONTROL FOR VEHICLE CENTRAL TIRE INFLATION SYSTEM

FIELD OF THE INVENTION

The present invention relates to central tire inflation systems (CTI Systems or CTIS), also known as on-board inflation systems or traction systems. Such systems monitor and vary tire pressure from a remote location on the vehicle while the vehicle is at rest and/or in motion. This invention is particularly concerned with a CTIS inflation control which adapts according to inflation rate of the CTIS air system, the inflatable volume of the vehicle tires and vehicle usage.

DESCRIPTION OF THE PRIOR ART

Central tire inflation systems are well known in the prior art as may be seen referenced to U.S. Pat. Nos. 4,640,331; 4,678,017; 4,754,792; 4,782,879; 4,804,027; 4,883,106; 4,898,216; 4,922,946; 4,924,926; and published European Patent Applications 0,297,837; 0,352,921; and U.S. patent application Ser. No. 726,067 filed Jul. 5, 1991. The disclosures of these patents and the application are incorporated herein by reference.

It is known to provide CTIS inflation controls which connect a pressurized air source with inflatable tire volumes for a time period adjusted in part as a function of a sensed difference in current tire pressure and demand or desired tire pressure. The inflation control then checks the new current tire pressure and reconnects the air source for a series of such time periods and checks as necessary to bring current and demand tire pressures with limits. Such a CTIS inflation control is not universally satisfactory for installation in vehicles having air systems with different inflation rates and/or different tire volumes and/or having different usage. For example, an inflation time period adjusted only as a function of a sensed difference in current and demand tire pressures may effect greater than desired pressure increases per time period in a system having a high inflation rate air source and/or low tire volume. On the other hand, the inflation time period may provide less than desired pressure increases in systems having low inflation rates and/or high tire volume and/or in a vehicle wherein normal usage requires cycling between low and high tire pressures. Such less than desired pressure increases per time period causes long series of inflation time periods and pressure checks, thereby increasing system wear and the time required to correct a low tire pressure condition.

SUMMARY OF THE INVENTION

An object of this invention is to provide a CTIS inflation control which adapts to different system conditions and usage.

According to a feature of the invention, a vehicle includes a plurality of inflatable tire volumes and an on-board tire pressure control comprising: An air source provides pressurized air for inflating the tires. Valve means are movable from a closed position blocking air communication between the air source and the tire volumes to an open position allowing such communication in response to a valve open signal. Selector means provide any of several demand tire pressure signals representative of desired tire pressure. A control circuit includes means operative to produce an inflation signal in response to means producing a signal indicating current tire pressure is less than demand tire pressure.

The improvement comprises: Means operative in response to the inflation signal to initiate transmittal of a series of the valve open signals to the valve mean with a time space between each valve open signal and with each signal having a time period. Means are provided to terminate the series in response to means sensing that the current tire is not less than the demand tire pressure. Means are provided to produce a count of valve open signals in the series. And means are provided to increase the time period in a next series in response to the count being greater than a predetermined count range and for decreasing the time period in the next series in response to the count being less than the predetermined count range.

BRIEF DESCRIPTION OF THE DRAWINGS

The CTI system of the present invention is shown in the accompanying drawings in which.

DETAILED DESCRIPTION OF THE DRAWINGS

Figure 1:
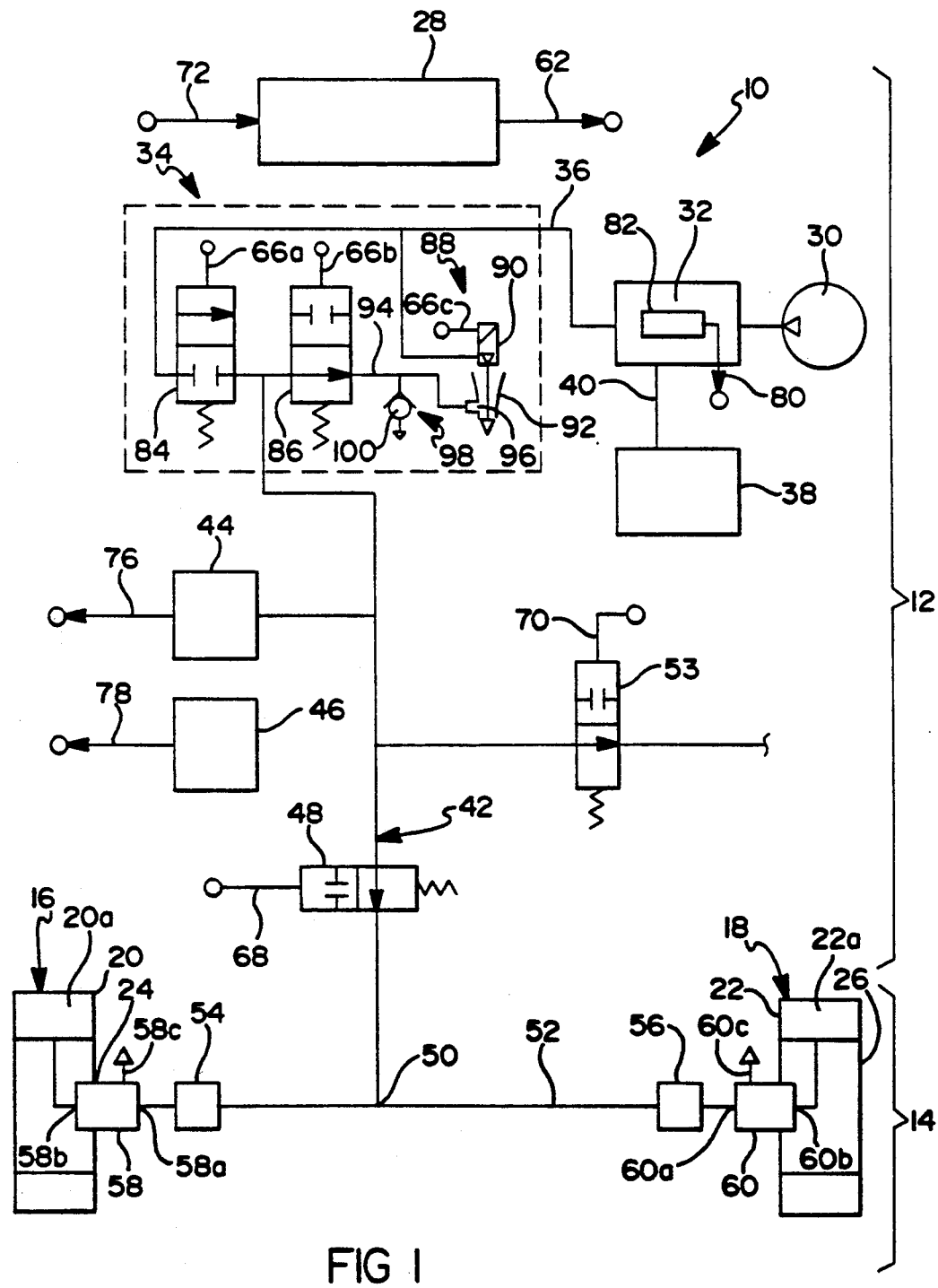
FIG. 1 is a brief schematic illustration of the system air, electronic and wheel components.

The schematic of FIG. 1 illustrates a CTIS 10 for a vehicle having system components mounted on a body/chassis represented by a bracket 12 and components mounted on an axle assembly 14 represented by a bracket 14. The axle assembly includes left and right wheel assemblies 16,18. The vehicle is preferably, but not necessarily, of the heavy duty truck type. The axle assembly may be a steer or nonsteer axle, a drive or nondrive axle, and/or a tandem axle. The wheel assembly may be of the single or dual wheel type. The CTIS measures and controls the inflation pressure of interior volumes 20a,22a of tires 20,22 mounted on wheels 24,26 of the wheel assemblies. The CTIS herein controls tire pressure of groups of tires, e.g., the tires on a steer axle, single or tandem drive axles, and in some installations tires on trailer axles.

Figures 2, 3:
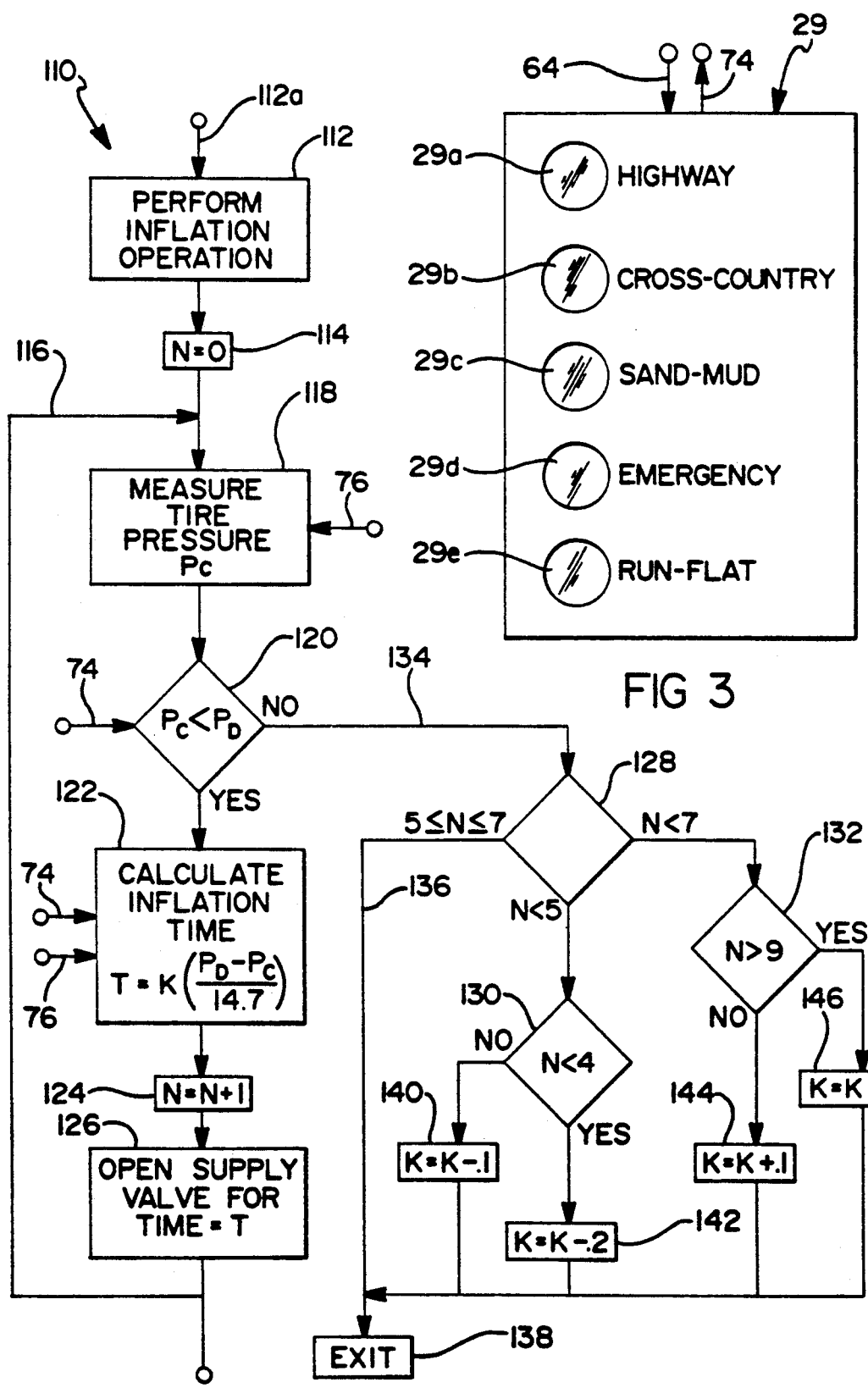
FIG. 2 is a schematic illustration of the CTIS inflation control according to the invention.
FIG. 3 is a schematic illustration of an operator control panel for changing demand or desired tire pressure.

The chassis mounted components include a microcontroller 28, a vehicle operator control panel 29 shown in FIG. 3, a source of pressurized air including a compressor 30 normally driven by the vehicle engine and an air tank 32 connected to a pneumatic control assembly 34 via a conduit 36 and to a vehicle brake system 38 via a conduit 40, an air manifold 42, a manifold air pressure sensor 44, a vehicle speed sensor 46, an axle valve 48 fluidly connected between manifold 42 and a T-connector 50 in a conduit 52 extending between the left and right tires of axle assembly 14. Any additional number of axle valves 53 may be provided for other axle assemblies. Alternatively, the axle valves may be configured to separately communicate the left and right tire volumes with manifold 42.

Conduit 52 fluidly communicates with each tire volume 20a,22a via rotary seal assemblies 54,56 and wheel valves 58,60. Examples of rotary seals may be seen by reference to U.S. Pat. Nos. 4,640,331; 4,804,027; 4,883,106 and U.S. application Ser. No. 726,067. Each valve 58,60 includes an inlet 58a,60a communicating with conduit 52 via the associated rotary seal and an outlet 58b,60b communicating with the associated tire volume. Preferably, each valve includes valve means for venting the associated tire volume to a vent or atmospheric opening 58c,60c in response to some form of command from microcontroller 28. The atmospheric opening may be at the wheel valve, as disclosed in U.S. Pat. Nos. 4,678,017; 4,782,879; 4,922,946 and U.S. patent application Ser. No. 753,526. Alternatively, the atmospheric opening may be remote from the wheel valve as disclosed in U.S. Pat. No. 4,640,331, therein the atmospheric opening is provided by a quick release valve positioned in lieu of T-connector 50.

Wheel valves 58,60 contemplated for use in the CTIS embodiment herein block air communication between the tire volumes 20a,22a and the associated valve inlets 58a,60a and atmospheric openings 58c,60c when air pressure at the inlet is substantially at atmospheric pressure. When the air pressure at inlets 58a,60a is a predetermined pressure above atmospheric pressure, the valves allow fluid communication of the tire volumes with conduit 52. When the air pressure at the inlets 58a,60a is a predetermined pressure less (vacuum) than atmospheric pressure, the valves allow fluid communication of the tire volumes with the associated atmospheric openings 58c,60c. Alternatively, the CTIS may be provided with wheel valves which are closed when air pressure at the inlets is substantially equal to atmospheric pressure, open for inflating the tires when the inlet air pressure is above a first predetermined minimum, and in a vent position when the inlet pressure is a predetermined pressure above atmospheric pressure and below tire pressure.

Microcontroller 28 includes a programmed microprocessor device/devices for processing and issuing command output signals via an output wiring harness 62. Harness 62 is connected to control panel 29 via a wiring harness 64, to pneumatic controller assembly 34 via conductors 66a,66b,66c and to axle valves 48,53 via conductors 68,70. The output signals are generated in accordance with known logic rules and in response to input signals received via an input wiring harness 72. Details of programming such microprocessor devices are known and rather straightforward given a flow diagram for the program. Input harness 72 receives signals from control panel 29 via a wiring harness 74, manifold pressure signals for pressure sensor 44 via a conductor 76, vehicle speed signals from speed sensor 46 via a conductor 78, and an air source pressure signal from a conductor 80 connected to a pressure sensor 82 on air tank 32. Microcontroller 28 renders the CTIS inoperative whenever the air source pressure signal indicates that the air source pressure is less than needed for safe operation of the vehicle brakes. As is known in the art, CTIS microcontroller 28 is programmed to issue a tire pressure check command at vehicle start-up and periodically during vehicle operation. If the pressure check indicates that current tire pressure $P_C$ is greater than or less than a demand pressure $P_D$, the controller issues either a deflate or inflate command.

Operator control panel 29, as shown herein, includes light emitting push switches 29a,29b,29c,29d,29e respectively labeled "Highway", "Cross-Country", "Sand-Mud", "Emergency", and "Run Flat". Of course more or fewer switches may be provided. Additional detail concerning panel 29 may be seen by reference to U.S. Pat. No. 4,754,792 and published European Patent Application 0,297,837. Switches 29a through 29d instruct the microcontroller to maintain the vehicle tires at a demand pressure $P_D$ corresponding to the labeled type operation of switches 29a-29d. For example, activation of switch 29a corresponds a tire pressure of 3.02 bar (45 psi), switch 29b corresponds to a pressure of 2.35 bar (35 psi), switch 29c corresponds to a pressure of 1.68 bar (25 psi), and switch 29d corresponds to a pressure of 0.8 bar (12 psi). The microcontroller may be programmed to override the reduced pressure setting of switches 29b,29c,29d when vehicle exceeds a predetermined speed, e.g., 65 Km/hr (40 MPH). Activation of Run-Flat switch 29e instructs the microcontroller to increase the pressure check frequency and to maintain tire pressure corresponding to which switch 29a-29d is activated.

Pneumatic control assembly 34 includes a pressure check and inflate valve 84, a vacuum and manifold vent valve 86, and a vacuum generator 88 including a solenoid valve 90 connected to the air source 32 and a venturi 92. Valve 84 has an inlet connected to the positive pressure of the air source via conduit 36 and an outlet connected to manifold 42. Valve 86 has an inlet connected to manifold 42 and an outlet connected via a conduit 94 to a small orifice 96 opening into the throat of the venturi. The venturi produces a vacuum or negative air pressure in conduit 94 relative to ambient atmospheric air pressure in response to a deflate signal from the microcontroller opening solenoid valve 90 to allow a stream air from the air source to flow through the venturi. Conduit 94 is also connected to a one-way vent valve 98 for effecting rapid venting of positive air pressure in conduit 94. Vent valve 98 includes a valving member 100 drawn to a closed position in response to a negative air pressure in conduit 94 and moved to the open position against a biasing force in response to positive pressure air in conduit 94.

CTIS 10 is designed to automatically maintain tire pressure at or near demand pressure $P_D$ selected by control panel 29 in accordance with microcontroller programming. The vehicle operator has the capability of commanding the system to decrease or increase tire pressure for improving tire traction or increasing load carrying capacity of the vehicle by merely activating the appropriate control panel switch. The system automatically increases tire pressure if the vehicle speed, as monitored by speed sensor 46, exceeds a predetermined speed for the selected tire pressure.

When the vehicle ignition is energized and pressure switch 82 is closed, controller 28 initiates a pressure check sequence of the tires on each of the axle assemblies. If tire pressure of any of the axles is found to be a predetermined amount less than demand pressure, an inflation sequence is initiated for the axle or axles effected. During vehicle operation, the microcontroller automatically initiates periodic pressure check sequences. When enhanced or maximum traction is required, the vehicle operator may command reduced tire pressure by pushing the appropriate switches on control panel 29; if the vehicle speed is greater than a predetermined amount for the selected reduced pressure, the microcontroller will not initiate the appropriate pressure deflation sequence.

With control assembly valves 84,86 and axle valves 48,52 in the positions of FIG. 1 and with vacuum source solenoid valve 90 closed, manifold 42, conduit 52 and each of the rotary seals 54,56 are vented to atmosphere through vacuum generator 88 and vent valve 98 via vacuum control valve 86. Wheel valves 58,60 close in response to this venting.

A pressure check sequence is initiated for axle assembly 14 by energizing valves 86 and 53 to the closed positions and momentarily energizing valve 84 to the open position to provide positive air pressure sufficient to move valving means of wheel valves 58,60 to positions intercommunicating the inlets and outlets thereof. De-energization of valve 84 returns the valving member therein to the closed position. With valve 84 closed and valves 48,58,60 open, the pressure in manifold 42 and conduit 52 soon equalizes to tire pressure. The microcontroller reads this pressure via electrical signals from sensor 44 and initiates inflate/deflate sequences as required. If no further sequence is required, vacuum valve 86 is de-energized to effect its open position, thereby connecting the wheel valve assembly inlet ports to the vent through vacuum generator 88 and vent valve 98.

A tire deflation sequence is initiated for axle assembly 14 by energizing valve 53 to the closed position and energizing vacuum source solenoid 90 to the open position to provide a negative air pressure in manifold 42. Adequate vacuum sensed at pressure sensor 44 causes microcontroller 28 to de-energize valve 48, thereby creating negative pressure in conduit 52 and at inlets 58a,60a for moving the wheel valve valving means to positions connecting outlets 58b,60b to vents 58c,60c illustrated in FIG. 3. The deflation sequence is terminated by de-energizing vacuum source solenoid valve 90 to the closed position. An example of details of a tire deflation sequence may be seen by reference to published European Patent Application 0,352,921.

Looking now mainly at FIG. 2, therein is schematically shown a control unit 110 for producing a series of valve open signals applied to inflate valve 84 in response to an inflate signal. Each valve open signal has a controlled time period T. Unit 110 includes a Perform Inflation Operation device 112 which activates an initializer device 114 to set a count n of a counter device 124 equal to zero in response to an inflate signal applied to a conductor 112a. Cycling of initializer device 114 or a valve open signal on a conductor 116 activates a Measure Tire Pressure device 118 which checks current tire pressure $P_c$ provided by manifold pressure sensor conductor 76 and applies a $P_c$ signal representative of current tire pressure to a $P_C < P_D$ comparator device 120 which also receives a demand pressure signal $P_D$ from control panel harness 74. At the beginning of each inflate sequence $P_C$ will normally be less than $P_D$. Accordingly, comparator 120 will apply an output signal on a "yes" terminal thereof to activate a Calculate Inflation Time device 122. Device 122 produces the valve open signal having a time period $T = k[(P_D - P_C)/1.01 \text{ bar}]$. Each valve open signal is counted by the counter 124 and then applied by an Open Inflate Valve device 126 for the time period T to conductor 116 which is also connected to inflate valve conductor 66a. Termination of each valve open signal initiates additional pressure checks and valve open signals until $P_C \geq P_D$; at which time comparator device 120 applies an output signal representative of the count n on a "No" terminal and a conductor 134 thereof to activate count comparators 128,130,132. Comparator devices 128,130,132 change the value of the k factor in the equation of Calculate Inflation Time device 122 if the count n of counter device 124 is not a predetermined target value range. Herein, the target value range is $5 \leq n \leq 7$. If the count n applied to comparator device 128 is $5 \leq n \leq 7$, comparator 128 applies a signal via a conductor 136 to an "Exit" device 138 for terminating the inflate sequence without changing the value of the k factor via a conductor. If $n < 5$, comparator device 128 applies the count n to comparator device 130 which applies a signal to a k-value device 140 to change $k = k - 0.1$ if the count $n = 4$, and which applies a signal to a k-value device 142 to change $k = k - 0.2$ if $n < 4$. Devices 140,142 both apply a signal to Exit device 138 to terminate the inflation sequence after they have effected a change in the value of k. If $n > 7$, comparator device 128 applies the count n to comparator device 132 which applies a signal to a k-value device 144 to change $k = k + 0.1$ if $n < 9$, and which applies a signal to a k-value device 146 to change $k = k + 0.2$ if $n > 9$.

Control unit 110 allows the CTIS inflation sequence to adapt to vehicles having air systems with different inflation rates (e.g., different air sources capacities, different system pressures or pressure drops in the system, etc.) and/or different size tire volumes to be inflated, and/or vehicles having different usage. For example, with two vehicles having substantially the same air system and tire volumes, one of the vehicles may operate mostly on relatively unchanging surfaces and rely on the CTIS mainly to correct relatively small differences between current and demand pressure, whereas the other vehicle may operate on often changing surfaces requiring frequent pressure changes between maximum and minimum demand pressures. Control unit 110 adapts to these variables by adjusting the time periods T of the valve open signals to avoid overinflation of the tires due to longer than necessary time periods T and to avoid overly long inflation sequences and system wear due to shorter than necessary time periods T. By way of further example, control unit 110 adapts wherein like engine driven compressors have different discharge volumes due to different engine operating speed.

A preferred embodiment of the invention has been disclosed for illustrative purposes. Many variations and modifications of the preferred embodiment are believed to be within the spirit of the invention. The following claims are intended to cover the inventive portions of the preferred embodiment and variations and modifications within the spirit of the invention.

What is claimed is:

1. A vehicle including a plurality of inflatable tire volumes and an onboard tire pressure control system comprising:

an air source providing pressurized air for inflating the tires;

valve means movable from a closed position blocking air communication between the air source and the volumes to an open position allowing such communication in response to a valve open signal;

selector means producing any of several demand tire pressure signals representative of desired tire pressure;

a control circuit including means operative to produce an inflation signal in response to means producing a signal indicating current tire pressure being less than demand tire pressure, the improvement comprising;

means operative in response to the inflation signal to initiate transmittal of a series of the valve open signals with a time space between each valve open signal and with each valve open signal having a time period;

means for terminating the series in response to means sensing the current tire pressure not being less than the demand tire pressure;

means for producing a count of the number of valve open signals in the series; and means for increasing the time period in a next series in response to the count being greater than a predetermined count range and for decreasing the time period of the next series in response to the count being less than the predetermined count range.

2. The system of claim 1, wherein:

the means operative includes calculate means for progressively decreasing the time period of each valve open signal in response to a decreasing pressure difference between the demand and the current tire pressures.

3. In a method of controlling inflation of inflatable volumes of tires on a vehicle having an on-board tire pressure control system including a source of pressurized air connectable with the volumes by valve means opened in response to valve open signals, the method comprising the steps of;

producing a demand tire pressure signal;

producing a current tire pressure signal;

comparing the demand and current tire pressure signals and producing an inflation signal in response to the comparing indicating current tire pressure is less than demand tire pressure;

producing a first series of the valve open signals with a time space between each signal and with each signal having a time period;

terminating the series in response to the current tire pressure not being less than the demand tire pressure;

producing a count of the number of valve open signals in the first series; and increasing the time period of a subsequent series in response to the count being greater than a predetermined count range and decreasing the time period of the subsequent series in response to the count being less than the predetermined count range and repeating the series for subsequently produced demand tire pressure signals.

4. The method of claim 3, including the step of;

decreasing the time period of each valve open signal in response to a decreasing pressure difference between the demand and the current tire pressure.

* * * * *